United States Patent Office 2,885,367
Patented May 5, 1959

2,885,367

PROCESS FOR BREAKING PETROLEUM EMULSIONS EMPLOYING CERTAIN OXYALKYLATED PHENOL-ALDEHYDE RESINS

Everett N. Case, Homewood, Ill., assignor to Sinclair Refining Company, New York, N.Y., a corporation of Maine No Drawing. Application December 30, 1954
Serial No. 478,921

6 Claims. (Cl. 252—33)

This invention relates to processes particularly adapted for breaking or resolving emulsions of the water-in-oil type. More particularly, this invention relates to processes of treating crude oil containing water, brine or sludge like materials dispersed in a substantially permanent state throughout the oil, to break this state thereby permitting simple resolution and separation of the components of the material treated.

Emulsifying agents are broadly classified into two categories, those which stabilize water-in-oil emulsions and those which stabilize oil-in-water emulsions. Generally, emulsifying agents of the opposite type tend to work against and neutralize each other. Advantage is taken of this phenomenon when one wishes to break an emulsion. Thus, according to the classical theory, if it is desired to break a water-in-oil emulsion, stabilized by water-in-oil emulsifying agents, sufficient oil-in-water type emulsifying agent is added to cause this effect. In accordance with the classical theory, the prior art methods of resolving petroleum emulsions of the water-in-oil type employ those emulsifying agents characterized by being endowed with sufficient hydrophile property to be in fact oil-in-water type emulsifying agents. Hence, such patents as De Groote et al., Patent No. 2,499,370, issued March 7, 1950, and De Groote et al., Patent No. 2,557,081, issued June 19, 1951, describe processes for breaking or resolving emulsions of the water-in-oil type which employ certain oxyalkylated phenol-aldehyde resin demulsifiers which contain a number of alkyleneoxy radicals (always at least twice the number of phenolic nuclei) sufficient to endow the demulsifiers with definite hydrophile properties, or be self-emulsifiable or self-dispersible; this condition is indicated as being the state where the hydrophilic end of the molecule predominates.

Directly contrary to the teachings of the classical theory and prior art such as the De Groote et al. patents cited in the preceding paragraph, I have discovered that crude oil or petroleum emulsions of the water-in-oil type can be broken or resolved by employing as the demulsifying agents a class of chemical compounds which are non-emulsifiable or, when capable of emulsifying, form emulsions of the water-in-oil type. According to my invention, an oxyalkylated phenol-aldehyde resin, characterized by containing an alkyl phenol from a definite class of phenols and containing a critical amount of oxyalkylene groups as the hydrophilic component of the molecule, is employed as the demulsifier for resolving petroleum emulsions of the water-in-oil type in an economical and rapid manner.

The oxyalkylated phenol-aldehyde resins constituting the demulsifiers used in my invention can be manufactured by condensing an appropriate alkyl phenol with a suitable aldehyde to form a resin and then oxyalkylating the resin with certain oxyalkylene groups more particularly defined below. The alkyl phenols which can be employed in producing the demulsifiers of my invention are monocyclic phenols having an alkyl substituent in the para position containing not less than 3 nor more than 5 carbon atoms. Examples of phenols within the above definition include p-tertiary butyl phenol, p-isopropyl phenol, p-tertiary amyl phenol, p-secondary amyl phenol and p-secondary butyl phenol. While para substituted phenols must be employed to produce satisfactory demulsifiers for this invention, the presence of ortho-substituted phenols (e.g., up to about 12 percent) and of meta-substituted phenols (e.g., up to about 5 percent) included with the para-substituted phenol will not materially affect the results and in some instances is desirable. Aldehydes which may be employed are characterized by being reactive towards the phenols utilized and contain 1 to 8 carbon atoms per molecule. These aldehydes include, for example, formaldehyde, its trimer and linear polymer, in addition to acetaldehyde, propionic aldehyde, 2 - ethylhexanal, butyraldehyde, ethylbutyraldehyde, methylbutyraldehyde, benzaldehyde, furfural, heptaldehyde, and glyoxal.

In general the prior art methods of preparing resins to be oxyalkylated, as evidenced by the De Groote et al. Patents Nos. 2,499,370 and 2,557,081 can be employed in this invention subject to the express modifications and preferences, indicated before and hereinafter, designed to insure the production of resins suited for my oxyalkylation step. The prior art resin preparation methods of the aforementioned De Groote et al. patents are hereby incorporated into this disclosure in order to avoid extending the disclosure by detailed treatment of well-known procedures.

Resins suitable for oxyalkylation to produce demulsifiers useful in my invention are characterized by being phenol aldehyde resins which are susceptible to oxyalkylation, fusible, soluble in acetone and certain other organic solvents but substantially insoluble in hydrocarbons and water. The resins have high molecular weights of the order of about 7,000 to 15,000, and usually about 10,000; on a phenol nuclei basis, my resins generally have about 40 to 100 phenol nuclei per molecule. The general range of aldehyde to phenol ratios which produce suitable resins is about 0.70 to 1.5 moles of aldehyde per mole of phenol. I have found that particularly satisfactory resins are obtainable using an aldehyde to phenol mole ratio of about 1.0 to 1.2:1. I prefer to use one-half to one and one-half percent of concentrated hydrochloric acid as a catalyst for this condensation although sulfuric acid, phosphoric acid, sodium hydroxide, or potassium hydroxide can also be employed. As with the catalyst, the use of a solvent for the resin is not essential; however, as it permits handling the resin by pumping, facilitates contact between the reactants and tends to keep the reaction mixture from becoming too viscous, a solvent is employed ordinarily. Of the many solvents suitable, as indicated by prior art, xylene is preferred because it is inexpensive, may remain for use in the oxyalkylation step and does not contaminate the demulsifier produced since the demulsifier can be employed as a solution in xylene. It is to be understood that the mixture of resin and xylene is not a true solution in the absolute sense of the word. The use of detergents has been found to aid the resin-forming step and of the many suitable detergents, monoalkylated benzene monosulfonic acids or the sodium salts thereof, wherein the alkyl group contains 10 to 20 carbon atoms, have been found to be very effective.

One modification of prior art methods of resin preparation which has been found to enhance the resins for purposes of this invention entails refluxing the mixture remaining after separation of substantially all of the water content as the last step in the resin forming procedure. This refluxing operation generally may be effected at about 150° C. and should extend for at least about two hours during which time a small amount of water is taken overhead. Higher molecular weight resins appear to be formed by the refluxing operation, apparently resulting from greater polymerization and possibly from cross linking of various polymers.

The following are examples of the preparation of resins suitable for subsequent oxyalkylation to produce the demulsifiers useful in this invention. It is to be understood that the invention is not to be limited by the details recited in the examples.

EXAMPLES OF PHENOL-ALDEHYDE RESIN FORMATION

Example I

| | Quantity |
|---|---|
| Para-tertiary butylphenol | moles__ 3.81 |
| Formaldehyde 37% (in water) | do____ 3.81 |
| Concentrated HCl | grams__ 5.7 |
| Monoalkyl ($C_{10}$–$C_{20}$) benzene monosulfonic acid sodium salt | grams__ 2.0 |
| Xylene | do____ 300 |

The para-tertiary butyl phenol (Dow commercial grade) containing small amounts of meta tertiary butyl phenol was mixed with the emulsifying agent and xylene by stirring and heating to 65° C. in a flask equipped for reflux operation. To the resulting solution the formaldehyde containing the hydrochloric acid catalyst was rapidly added with vigorous agitation. The contents of the reaction container were then heated to 90° C. at which point further heating was discontinued. An exothermic reaction became pronounced enough to carry the temperature up to the reflux temperature of the xylene-water azeotrope. The reflux is quite vigorous at the start and gradually subsides. At this point heat is again applied to maintain reflux. Reflux of the xylene-water azeotrope is continued for 1½ hours. At the end of this time the water introduced with the formaldehyde and the water formed by reaction is removed as rapidly as possible advantageously by raising the temperature. The time required for this operation runs from an hour to 3.5 hours depending on the rate of heating and equipment used. At the end of this water removal step the temperature of the contents of the reaction vessel rises to the boiling point of xylene (140–150° C.). At this point the water is substantially all removed. The reaction mixture is then refluxed at the boiling point of the xylene for a minimum of 2 hours. The resulting xylene suspension of resin was used in subsequent oxyalkylation reactions as indicated below.

Example II

| | Quantity |
|---|---|
| Para-tertiary-amylphenol | moles__ 1.75 |
| Formaldehyde, 37% (in water) | do____ 1.75 |
| Concentrated hydrochloric acid | grams__ 3 |
| Monoalkyl ($C_{10}$–$C_{20}$) benzene monosulfonic acid sodium salt | grams__ 1 |
| Xylene | do____ 200 |

The same procedure and the same type of equipment were used in making this resin as described in Example I. The xylene solution or suspension of this resin was employed in a subsequent oxyalkylation reaction to form demulsifiers useful in this invention.

Example III

| | Quantity |
|---|---|
| Para-isopropylphenol | moles__ 2.06 |
| Formaldehyde, 37% (in water) | do____ 2.06 |
| Concentrated hydrochloric acid | grams__ 3 |
| Monoalkyl ($C_{10}$–$C_{20}$) benzene monosulfonic acid sodium salt | grams__ 1 |
| Xylene | do____ 200 |

The same type of equipment and the same procedure was used in making this resin as described in Example I.

The formation of the alkyl phenol-aldehyde resin employing any of the other alkyl phenols mentioned as within the purview of this invention, either with formaldehyde or one of the other aldehydes, can be accomplished in a manner substantially similar to the examples set out above.

The product of the resin-forming step is a mixture containing some unreacted alkyl phenol and polymer chains of various lengths. The presence of some unreacted alkyl phenol apparently has no effect on the product quality. The higher molecular weight fractions are not soluble in the xylene, and on standing precipitate out. The soluble portion of the resin solution without the precipitate is suitable for oxyalkylation, but is not as effective as the insoluble portion. In general no attempt is made to separate the two portions. In the event the entire resin is to be employed in the subsequent oxyalkylation reaction, the quantity of oxyalkylene groups necessary can be determined by the quantity of phenol employed in the resin-forming step. For example, if $x$ were the moles of phenol reacted and the total solution were to be oxyalkylated, the moles of oxyalkylene groups to be employed would be simply 0.75 to 1.75 times $x$, depending upon the choice of the particular ratio of oxyalkylene groups to phenolic nuclei, from the operable range, desired.

As noted above, the resin reaction mixture contains resin molecules of varying molecular weights. In special instances it may be desirable to produce the demulsifier by employing a resin with a particular range of molecular weights. The resin product can be separated into various fractions by the following procedure: The precipitated or xylene insoluble portion can be separated by filtration or centrifuging. The soluble portion can then be further separated by precipitating the higher molecular weight components by the addition of methanol. The precipitated material is then removed as above. The molecular weight of the original resin mixture or the fractions cannot be determined by the conventional cryoscopic or ebullioscopic methods because of their very high molecular weight. These methods are not reliable when resins above 1000–2000 M.W. are used. Since my resins have molecular weights on the order of about 10,000 and higher these methods are obviously of no use. Therefore, by using such formulae as those proposed by Vanscheidt [1] [developed from Koebner [2]] or Flory [3] the molecular weight of my resins were calculated.

As with the resin-forming procedure, the general method of oxyalkylation is a well-known process as may be seen in the De Groote et al. patents previously cited. In general, such prior art methods can be employed to produce the demulsifiers used in my invention insofar as their temperatures, pressures, order and rate of reactant addition, catalysts, atmosphere, equipment, etc., conditions are concerned varied only by such exceptions, modifications and preferences which I expressly set forth. In order to avoid needless recitation of the prior art, the disclosure relating to methods and conditions of oxyalkylation in the above cited De Groote et al. patents are hereby incorporated in this disclosure.

The oxyalkylation reaction is carried out employing oxyalkylene groups corresponding functionally to the alpha-beta alkylene oxides containing not more than four carbon atoms. Examples of such groups are ethylene oxide, propylene oxide, alpha-beta butylene oxide, glycide and methyl glycide and mixtures thereof. I have found that results which are eminently satisfactory are obtained when the oxyalkylene groups employed are derived from a mixture containing 35 to 45 mol percent ethylene oxide and 65 to 55 mol percent propylene oxide. However, a more generally preferred range of compositions of oxyalkylene groups extends from substantially pure propylene oxide to about a 70:30 (mol ratio) mixture of ethylene oxide and propylene oxide. While 100 percent ethylene oxide may be used to oxyalkylate the resin and ---
[1] Org. Chem. Ind. (U.S.S.R.) 3, 385–393 (1937).
[2] Z. angew. Chem., 46, 251–256 (1933).
[3] J. Am. Chem. Soc. 65, 372 (1943).

though it produces an excellent demulsifier for certain emulsions, demulsifiers produced with it do not appear to be as broadly applicable and effective as the demulsifiers produced employing the preferred oxide compositions.

In producing the oxyalkylated phenol-aldehyde resin demulsifiers for use in my invention, it is of critical importance that the relative amount of oxyalkylene groups used be controlled very carefully. In the event that an excess is used, the product produced falls outside the limits of the compositions of demulsifiers which may be used in my invention. As pointed out above, the demulsifiers useful in my invention are water-in-oil emulsifying agents or are non-emulsifying. As shown in the De Groote et al. patents, there is a definite point when oxyalkylating phenol-aldehyde resins where the dominating characteristics of the demulsifier produced becomes hydrophilic. Such point is generally reached and the resulting demulsifier becomes definitely hydrophilic in character when two or more moles of oxyalkylene groups are reacted with the resin per one mole of phenolic nuclei present. As should now be apparent from the previous characterization of the demulsifiers useful in my invention, my demulsifiers can be produced only if the quantity of oxyalkylene groups employed in the oxyalkylation is materially less than two moles per mole of phenolic nuclei in the resin. The practical limiting ratio of oxyalkylene to phenolic nuclei is about 1.75:1; the operable range extends from about 0.75:1 to 1.75:1 with the range of 1.25:1.0 to 1.70:1.0 being preferred.

Of the prior art catalysts known to be useful for such oxyalkylations, I prefer to use sodium methoxide as it has been found to result in consistently satisfactory products. It is used in amounts sufficient to neutralize any acid catalyst present in the charge as a result of the resin forming condensation, plus an additional 1 to 2 percent, based on the resin charge, to catalyze effectively the oxyalkylation reaction. A suitable mean temperature range is about 100° C. to 200° C. With agitation the reaction is effected in a relatively short time of from several minutes to 6 to 10 hours. While pressures of several hundred pounds per square inch gauge can be employed, practical considerations in commercial production indicate the use of a maximum pressure of about 50 p.s.i.g. The order of addition of reactants appears to be a matter of preference for the operator, but I have obtained consistent results and ease of operation when charging the resin and catalyst to the reaction vessel, heating to the reaction temperature and then adding the oxyalkylene groups.

The following are examples of the oxyalkylation step employed in producing the demulsifiers to be used in practicing my invention. It should be understood that it is not intended to limit the scope of this invention by the details disclosed in the examples.

OXYALKYLATION EXAMPLES

*Example IV*

| | Quantity |
|---|---|
| Resin | grams 135 |
| Xylene | do 65 |
| Ethylene oxide | moles 0.528 |
| Propylene oxide | do 0.600 |
| Sodium methoxide | grams 2 |

One hundred and thirty-five grams of resin, prepared by the procedure of Example I were mixed with the xylene and, with the catalyst, were charged to a high pressure reaction pot. The system was purged with nitrogen and then closed off. As stirring was begun, the temperature was raised to 150° C. The mixture of ethylene oxide and propylene oxide was added in two batches, causing the temperature to go up to 165° C. where it was maintained for the remainder of the reaction. When the pressure which resulted from the addition of gaseous oxides had dropped back to its initial value, the reaction was considered complete and the product removed. The final product was an 84.7 percent solution in xylene of oxyalkylated resin having a molar ratio of alkylene oxides to phenolic unit of 1.37:1.

Numerous other samples were made employing resins obtained by following the procedure of Example I. The oxyalkylation procedure employed was the same as in Example IV; however, the type of oxyalkylation was varied as respects the oxyalkylene group introduced and the mol ratio of oxyalkylene group to phenolic nuclei in the resin used. Thirty-two such examples representative of the resins which can be produced are tabulated in Table III below.

The present invention is concerned with treatment of petroleum emulsions by means of certain oxyalkylated resins which are water-in-oil type emulsifying agents or nonemulsifiable. The resins which can be employed for oxyalkylation are characterized by having the phenolic component chosen from alkyl phenols containing one alkyl substituent in the para position and the alkyl substituent having not less than 3 nor more than 5 carbon atoms therein. The oxyalkylated resins, in turn, consist of only those resins produced, utilizing any of the phenols indicated, which have been oxyalkylated with oxyalkylene groups corresponding to alpha-beta oxyalkylenes containing not over 4 carbon atoms per molecule, to the extent that they contain 0.75 to 1.75 moles of oxyalkylene group per mole of phenolic unit in the resin.

In practicing my invention for resolving petroleum emulsions of the water-in-oil type, a demulsifying agent or treating agent of the kind previously described is brought into contact with or caused to act upon the emulsion to be treated in any of the various apparatus now generally used to resolve or break petroleum emulsions with a chemical agent. My invention can be practiced using the demulsifying agents alone or in combination with other demulsifying procedure, such as the electrical dehydration process, or in combination with varying amounts of other demulsifying agents.

One common procedure which may be employed is to accumulate a quantity of the emulsion in a tank and conduct a batch treatment type of demulsification procedure to recover clean oil. In batch demulsification procedure, the demulsifier generally is mixed with the emulsion while the emulsion is being agitated. Various modifications, such as heating the emulsion or withdrawing the emulsion from the bottom of the tank and reintroducing it admixed with demulsifier into the top of the tank, can be employed.

In another common procedure which can be employed, the demulsifier is introduced into well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices can be introduced into the flow system. Heating devices can be incorporated in any system adopted. Other methods which can be used include employing the demulsifier directly to the crude oil-water mixture by adding it to the well and is known as "down-the-hole" demulsification. In all cases, it will be apparent, my process consists simply in introducing a relatively small proportion of demulsifier into a relatively large proportion of emulsion, insuring admixture of the demulsifier and emulsion, and allowing the mixture to stand until the undesirable water content of the emulsion separates and settles from the mass.

In testing demulsifiers, the efficiency or activity of the demulsifier compound is determined by observing the appearance of the treated emulsion; that is, the appearance of the treated emulsion is proportional to the efficiency or activity of the demulsifier compound. Freedom from cloudiness in the oil indicates an efficient demulsifier. Comparisons of samples of emulsions treated with different demulsifiers will indicate the relative efficiency and activity of the demulsifiers employed.

To demonstate the effectiveness of demulsifiers made in accordance with my invention, various demulsifiers as derived from the examples above were made up in 2 percent concentration in xylene as solvent; 0.1 cc. of the demulsifier solution was then added to a 100 cc. sample of crude oil emulsion of the water-in-oil type secured from a well of the Sinclair Oil & Gas Company's Slimmer lease producing from the Bemis Pool north of Hayes, Kansas. Each sample was vigorously shaken 200 times and then observed. Results of this test are tabulated below.

TABLE I

| Sample No. | Molar ratio oxide to phenolic unit | Appearance of Oil Sample |
|---|---|---|
| 1 | 0.165 to 1 | Cloudy. |
| 2 | 0.348 to 1 | Do. |
| 3 | 0.552 to 1 | Do. |
| 4 | 0.784 to 1 | Slightly cloudy. |
| 5 | 1.04 to 1 | Very slightly cloudy. |
| 6 | 1.37 to 1 | Bright. |
| 7 | 1.69 to 1 | Very, very slightly cloudy. |
| 8 | 2.08 to 1 | Cloudy. |

[NOTE.—(Samples 1 through 8 were made with resins formed of p-tertiary butylphenol and formaldehyde subsequently oxyalkylated with a 40:60 mixture of ethylene oxide and propylene oxide.)]

The appearance of sample emulsions was cloudy in all instances prior to addition of the demulsification agent. The above data emphasize the necessity for observing the limitations as regards the molar ratio of oxyalkylene group to phenolic unit of resin to be used in the oxyalkylation reaction; examples 1, 2, 3 and 8 fall outside the critical limits of the ratio and were clearly unsatisfactory demulsifying agents.

In order to demonstate the effectiveness of demulsifiers made in accordance with my invention, various demulsifiers as derived from the examples above were made up in 2 percent concentration in xylene as solvent. In certain instances, meta- or ortho-substituted phenols were added to the phenol in the preparation of the resins. The demulsifiers were then tested by adding samples thereof to a 100 cc. sample of crude oil emulsion from the Bemis Pool as above identified. Demulsifier sample No. 6 of Table I, which was prepared in Example IV, was used as a standard. Other demulsifiers were then rated according to the percentage of demulsifier required to produce the same results as the standard in the same period of time. Table II below summarizes these tests.

TABLE II

| Sample [1] | Position and type of Substituent in Resin [2] | Ratio, EtO:PrO Employed | Rating, Percent |
|---|---|---|---|
| Standard | 0 | 40:60 | |
| A | 2% m-cresol | 40:60 | 110 |
| B | 5% m-cresol | 40:60 | 110 |
| C | 10% m-cresol | 40:60 | Over 200 |
| D | 2% o-tertiary butylphenol | 40:60 | 120 |
| E | 7% o-tertiary butylphenol | 40:60 | 140 |
| F | 17% o-tertiary butylphenol | 40:60 | Over 200 |
| G | 100% p-Sec. amylphenol | 40:60 | 130 |
| H | 100% p-Sec. butylphenol | 40:60 | 110 |
| I | 0 | 70:30 | 133 |
| J | 0 | 50:50 | 122 |
| K | 0 | 20:80 | 112 |
| L | 0 | 0:100 | 109 |

[1] Demulsifiers were made using oxyalkylene groups in amounts and in ratio to phenolic nuclei identical with the standard.
[2] Difference between percent stated and 100 percent was p-tertiary butylphenol in all samples.

The above data demonstrate the effectiveness of demulsifiers made in accordance with the defined limits, as regards the type and place of alkyl substituent in the phenol unit of the resins employed, stated earlier in this disclosure. Where excessive amounts of ortho or meta substituents were included in the phenol, the demulsifiers were not desirable as shown in Examples C and F of Table II. All other demulsifiers fall within the limits established to produce satisfactory demulsifiers. The ratings disclose that demulsifiers produced in accordance with my instructions compare very favorably with my standard demulsifier.

In practicing my invention the demulsifier can be employed as made in solution. Since the solvent free demulsifier is a hard brittle solid it must be used in conjunction with suitable solvents. Xylene is such a solvent as are petroleum hydrocarbons, benzene, toluene, alcohols, pine oil, carbon tetrachloride, and similar materials. Because such a small amount of demulsifying agent is included, apparent insolubility of the agent in the solvent vehicle utilized is immaterial. It should be understood that "solvent" as used herein is not intended to be taken in the strict sense, but rather indicates a liquid carrier means in those cases where the resin is actually insoluble, i.e., in hydrocarbons.

The quantity, i.e., parts, of demulsifying agent required to resolve emulsions originating at different sources will differ widely. The relative amount required for each emulsion can be determined by simple laboratory tests conducted by anyone interested in the problem. One suitable test would consist of adding varying amounts of demulsifier, in a suitable solvent, to measured samples of emulsion. Ten samples could be tested containing parts of demulsifier per part of emulsion of 1 to 500; 1 to 1000; 1 to 5000; 1 to 10,000; 1 to 15,000; 1 to 20,000 and so forth. The proper amount as determined by observing the appearance of the sample would be bracketed by two samples. A further test could then be made in a similar manner to determine the optimum amount of demulsifier to employ. Such routine determinations are within the skill of laboratory technicians generally, and it is not meant to imply that any experimentation is necessary to practice this invention.

I have found the use of from 1 to 100 parts of demulsifying agent per 1000 parts of emulsion sufficient to resolve the emulsion within a time permitted by normal storage and settling capacity. Obviously, if settling capacity is limited, the time factor becomes very important and may justify the use of greater amounts of agent to speed the process. Such considerations are determined by the conditions under which the demulsification process is operated.

The demulsifying agents produced for use in my demulsifying process are distinguished from known agents mainly by the limitation imposed on the relative quantity of oxyalkylene groups used to oxyalkylate the phenol-aldehyde resins and the high molecular weight of the resins which are oxyalkylated. If two or more moles of oxyalkylene per mole of phenolic nuclei or unit of the resin are introduced, the agent resulting has definite hydrophile characteristics and is, therefore, outside the scope of demulsifying agents which can be employed in my invention. Demulsifying agents useful in my invention can be obtained only by oxyalkylating a phenol-aldehyde resin, which was formed using a phenol having one alkyl substituent of from three to five carbon atoms in the para position, with from about 0.75 to 1.75 moles of the defined oxyalkylene. Such demulsifying agents are very definitely not hydrophile in character. In fact the demulsifiers when solvent free are hard brittle solids and as such, of course, show no emulsion characteristics since they are water insoluble and will not disperse. The only instance in which the demulsifiers show any surface activity is when they are dissolved in solvents such as xylene. In solution they are generally non-emulsifiable, or if forming an emulsion will invariably form water-in-oil type emulsion. In no instance can these demulsifiers be classed as self-emulsifying or self-dispersing. To demonstrate this difference the data in Table III are offered.

TABLE III

| Demulsifier Sample Number (Prepared according to Example IV above) | Mole, Percent | | Molar Ratio of alkylene oxide to unit of tertiary butyl phenol in resin mixture | Emulsifiable | Type of Emulsion |
|---|---|---|---|---|---|
| | Ethylene Oxide | Propylene Oxide | | | |
| 1 | 100 | 0 | 1.0 | No | |
| 2 | 100 | 0 | 1.25 | Yes | H₂O in Oil. |
| 3 | 100 | 0 | 1.5 | Yes | Do. |
| 4 | 100 | 0 | 1.75 | Yes | Do. |
| 1 | 90 | 10 | 1.0 | Yes | Do. |
| 2 | 90 | 10 | 1.25 | Yes | Do. |
| 3 | 90 | 10 | 1.5 | Yes | Do. |
| 4 | 90 | 10 | 1.75 | Yes | Do. |
| 1 | 80 | 20 | 1.0 | No | None. |
| 2 | 80 | 20 | 1.25 | No | Do. |
| 3 | 80 | 20 | 1.5 | (*) | |
| 4 | 80 | 20 | 1.75 | (*) | |
| 1 | 70 | 30 | 1.0 | No | None. |
| 2 | 70 | 30 | 1.25 | No | Do. |
| 3 | 70 | 30 | 1.5 | No | Do. |
| 4 | 70 | 30 | 1.75 | No | Do. |
| 1 | 50 | 50 | 1.0 | No | Do. |
| 2 | 50 | 50 | 1.25 | No | Do. |
| 3 | 50 | 50 | 1.5 | No | Do. |
| 4 | 50 | 50 | 1.75 | No | Do. |
| 1 | 40 | 60 | 1.0 | No | Do. |
| 2 | 40 | 60 | 1.25 | No | Do. |
| 3 | 40 | 60 | 1.5 | No | Do. |
| 4 | 40 | 60 | 1.75 | No | Do. |
| 1 | 20 | 80 | 1.0 | No | Do. |
| 2 | 20 | 80 | 1.25 | No | Do. |
| 3 | 20 | 80 | 1.5 | No | Do. |
| 4 | 20 | 80 | 1.75 | No | Do. |
| 1 | 0 | 100 | 1.0 | No | Do. |
| 2 | 0 | 100 | 1.25 | No | Do. |
| 3 | 0 | 100 | 1.5 | No | Do. |
| 4 | 0 | 100 | 1.75 | No | Do. |

*Result not clear.

The test was used to determine whether the demulsifying agent formed an emulsion and, if so, the type formed, consisted of dissolving about 0.1 gram of the demulsifier in 5 ml. of xylene, adding 5 ml. of water and then shaking the mixture vigorously about 200 times. The sample was allowed to stand for about 16 hours, being examined then for the presence, if any, and type of emulsion. From the results tabulated it can be seen that demulsifiers used in my invention are non-emulsifiable in the vast majority of instances, and form water-in-oil type emulsions in the remainder of the examples. This test constitutes a method of determining whether a given demulsifier is within the scope of the present invention. That is, the demulsifiers of this invention are incapable of self-dispersing or forming an oil-in-water emulsion when one part of the demulsifier in 50 parts of xylene is shaken with 50 parts of water.

To demonstrate the difference between an oxyalkylated resin which does not have hydrophile properties, as in my invention, and such resins oxyalkylated to an extent to produce hydrophile properties the following test was made. A phenol aldehyde resin made according to Example I using paratertiary butyl phenol and formaldehyde was oxyalkylated with a 60-40 molar mixture of propylene and ethylene oxide. A series of samples was made as follows:

TABLE IV

| Sample No. | Percent mixed oxides in final demulsifier | Mole oxide ratio mole phenol in resin | Emulsification Characteristic |
|---|---|---|---|
| 1 | 30 | 1.33 | Non-emulsifiable. |
| 2 | 40 | 2.06 | Some emulsion character but not complete. |
| 3 | 50 | 3.09 | Forms good oil-in-water emulsion. |
| 4 | 60 | 4.63 | Do. |
| 5 | 70 | 7.20 | Do. |
| 6 | 80 | 12.3 | Do. |
| 7 | 90 | 27.9 | Do. |

The above samples were tested on fresh crude oil emulsion obtained from the Sinclair Oil & Gas Company, McGeorge No. 41 Well, Gainesville, Texas. The well was producing from the Atkins Formation. When a 4 percent solution of the above oxyalkylated compounds in xylene was added to 100 ml. of emulsion and the mixture shaken 200 times in a bottle, the following results were obtained:

TABLE V

| Sample | Ml. of solution required to produce bright oil |
|---|---|
| 1 | 0.1. |
| 2 | 0.2. |
| 3 | Between 0.2 and 0.5. |
| 4 | 0.5. |
| 5 | More than 0.5. |
| 6 | More than 0.7. |
| 7 | Do. |

From the above it can be seen that the composition within the scope of my invention, sample 1, is twice as effective as a borderline hydrophile product, i.e., sample 2, and 5 to 7 times as effective as oxyalkylated resins of definite hydrophile properties.

I claim:
1. A process for breaking petroleum emulsions of the water-in-oil type, characterized by subjecting the emulsion to the action of a demulsifier including an oxyalkylated phenol-aldehyde resin, said phenol being para substituted with a hydrocarbon radical containing from three to five carbon atoms, said aldehyde containing not over 8 carbon atoms per molecule and being reactive towards said phenol, said phenol-aldehyde resin characterized by being oxyalkylation susceptible, fusible, soluble in acetone but substantially insoluble in hydrocarbons and water, said oxyalkylated phenol-aldehyde resin having about 40 to 100 phenolic nuclei per molecule and being characterized by containing oxyalkylene groups in a quantity equivalent to about 0.75 to 1.75 moles per mole of phenolic nuclei from said phenol contained therein and further characterized by being incapable of being self-dispersable or producing an oil-in-water emulsion when 50 parts of xylene with one part of demulsifier are shaken vigorously with 50 parts of water, said oxyalkylene groups characterized by being derived from an alpha-beta alkylene oxide having not more than 4 carbon atoms per molecule.

2. The process of claim 1 wherein the oxyalkylated phenol-aldehyde resin demulsifier contains oxyalkylene groups in a quantity equivalent to about 1.25 to 1.70 moles per mole of phenolic nuclei therein.

3. A process for breaking petroleum emulsions of the water-in-oil type, characterized by subjecting the emulsion to the action of an oxyalkylated phenol-aldehyde resin demulsifier, said phenol being para substituted with a hydrocarbon radical containing from three to five carbon atoms, said aldehyde containing not over 8 carbon atoms per molecule and being reactive towards said phenol, said phenol-aldehyde resin characterized by being oxyalkylation susceptible, fusible, soluble in acetone but substantially insoluble in hydrocarbons and water, said oxyalkylated phenol-aldehyde resin having about 40 to 100 phenolic nuclei per molecule and being characterized by containing oxyalkylene groups in a quantity equivalent to about 1.25 to 1.70 moles per mole of phenolic nuclei from said phenol contained therein and further characterized by being incapable of being self-dispersable or producing an oil-in-water emulsion when 50 parts of xylene with one part of demulsifier are shaken vigorously with 50 parts of water, said oxyalkylene groups characterized by being derived from a mixture of about 35 to 45 mole percent ethylene oxide and about 65 to 55 mole percent propylene oxide.

4. The process of claim 1 where the aldehyde is formaldehyde.

5. The process of claim 2 where the aldehyde is formaldehyde.

6. The process of claim 3 where the aldehyde is formaldehyde.

References Cited in the file of this patent

UNITED STATES PATENTS

| | | |
|---|---|---|
| 2,454,541 | Bock et al. | Nov. 23, 1948 |
| 2,507,910 | Keiser et al. | May 16, 1950 |
| 2,615,853 | Kirkpatrick et al. | Oct. 28, 1952 |
| 2,658,885 | D'Alelio | Nov. 10, 1953 |